(12) United States Patent
Emond

(10) Patent No.: US 7,362,066 B2
(45) Date of Patent: Apr. 22, 2008

(54) OVERLOAD PROTECTION SYSTEM

(75) Inventor: Daniel T. Emond, West Bloomfield, MI (US)

(73) Assignee: Jervis B. Webb Company, Farmington Hills, MI (US)

(*) Notice: Subject to any disclaimer, the term of this patent is extended or adjusted under 35 U.S.C. 154(b) by 0 days.

(21) Appl. No.: 11/437,471

(22) Filed: May 19, 2006

(65) Prior Publication Data
US 2007/0267991 A1 Nov. 22, 2007

(51) Int. Cl.
*G01L 3/22* (2006.01)

(52) U.S. Cl. .................................. 318/434; 388/903

(58) Field of Classification Search ............... 318/434, 318/558; 388/903; 361/23
See application file for complete search history.

(56) References Cited

U.S. PATENT DOCUMENTS

| | | | |
|---|---|---|---|
| 3,657,923 A * | 4/1972 | Wildi ........................ | 73/862.17 |
| 4,502,549 A * | 3/1985 | Hornung et al. ............ | 173/183 |
| 4,532,488 A | 7/1985 | Blackburn | |
| 4,761,592 A | 8/1988 | Dissing et al. | |
| 4,879,901 A * | 11/1989 | Leon ........................... | 73/168 |
| 5,045,031 A * | 9/1991 | Thomey ...................... | 474/138 |
| 5,197,338 A * | 3/1993 | Heiman et al. ............. | 73/862.29 |
| 6,081,086 A | 6/2000 | Roth-Stielow et al. | |
| 6,138,520 A * | 10/2000 | Chang .......................... | 73/862.193 |
| 6,291,952 B1 | 9/2001 | Roth-Stielow et al. | |
| 6,459,182 B1 | 10/2002 | Pfann et al. | |
| 6,483,217 B1 | 11/2002 | Roth-Stielow et al. | |
| 6,518,528 B2 | 2/2003 | Nickerson et al. | |
| 6,948,381 B1 | 9/2005 | Discenzo | |
| 6,981,423 B1 | 1/2006 | Discenzo | |
| 7,019,951 B2 | 3/2006 | Plemmons et al. | |
| 2006/0044711 A1 | 3/2006 | Wiseman | |

OTHER PUBLICATIONS

Browning, Emerson Power Transmission, Drive Components, "TORQ/PRO Ball Detent Overload Clutches" 2001, pp. K67-K71.
SEWS Eurodrive, Constant Speed Gear Reducers R/F/K/S, 2002 Product Catalog, 3 pages.

* cited by examiner

*Primary Examiner*—Bentsu Ro
(74) *Attorney, Agent, or Firm*—Dickinson Wright PLLC

(57) ABSTRACT

An overload protection system and method of protecting a drive unit includes a torque arm assembly mounted to a fixture and a gear reducer. The reducer includes a bracket mounted to an axle of the reducer which is positioned adjacent to a measuring device. The torque arm assembly includes a switch mounted to sense a location of the reducer bracket relative to the switch thereby causing a condition of the drive unit to be adjusted. In the preferred embodiment, the switch is a proximity switch positioned adjacent to the bracket of the reducer after a desired preset torque of the torque arm is obtained through the use of a simple fastener and spring arranged in a housing.

14 Claims, 5 Drawing Sheets

OVERLOAD PROTECTION SYSTEM

BACKGROUND OF THE INVENTION

1. Technical Field

The present invention relates to the protection of systems and components, used in connection with electric motors, from an overload condition. More particularly, the present invention relates to an apparatus and method for protecting systems and components from experiencing an overload condition including, without limitation, electric motors, reducers, conveyors, and sprockets.

2. Discussion

Electric motors are used in industry for several different applications including, for example, conveying workpieces. Typically, electric motors are used with a reducer to provide varying torque to an output of the motor. When using the electric motors, it is desirable to shut off the electric motor prior to certain conditions including, for example, excess torque. Many various apparatus and methods for sensing such conditions and turning the motors to an off condition are known. Such prior art overload protection systems are known in the art to include the use of mechanical, electro-mechanical and electrical devices to monitor for an overload condition of an electric motor.

One example of such a prior art device includes the use of a set of friction clutch plates positioned internally in a motor and configured to stop the rotation of the motor after sensing a certain condition. Another device known in the prior art includes the use of sensors for sensing heat in a motor and causing the motor to adjust based on such sensed conditions. In both of the above-described prior art devices, the operator is provided with very little adjustability to detecting the overload condition since these prior art devices contain the overload detection, or actuation, inside of components used with electrical motors. As such, the adjustability of the overload condition is limited to that provided by the manufacturer of such components.

SUMMARY OF THE INVENTION

An object of the subject invention is to provide for an operator friendly overload protection system permitting the operator to easily adjust the overload condition over a wide range from zero to a predetermined maximum. Another object of the subject invention is to provide for the easy installation of an overload system into existing electric motor drive units without having to purchase replacements of the prior art complex overload protection systems including, for example, the above referenced overload protection system including friction plates inside of a reducer.

Another object of the subject invention is to provide a more precise overload protection system to thereby reduce the amount of variation existing in the prior art overload protection systems.

In view of the above, the present invention is directed to a system and method for sensing an overload condition of components used in connection with electric motors and altering the motor operation based on the condition sensed. The present invention includes an overload system including a torque arm assembly having a housing. The assembly further includes the use of a fastener and a helical spring axially aligned and retained, at least partially, by the fastener and the housing. The housing includes a flange portion for mounting a measuring device. The fastener extends through the end of the housing having the flange portion and is mounted to a bracket fixed to a reducer output shaft. A measuring device is mounted to said housing flange portion and measures a distance extending between the measuring device and the bracket fixed to the reducer output shaft.

The present invention includes a method of sensing an overload condition of components used in connection with electric motors along with changing the motor operation based on the condition sensed. The method includes positioning a measuring device on a torque arm having a housing and a spring mounted co-axially on a fastener. The torque arm is used to apply a preset torque on an output shaft of the motor. The torque is adjusted and applied to the output shaft by applying a load to the spring through the use of the fastener. A measuring device is used to measure the distance between the torque arm and a bracket fixed to the output shaft of the motor. Also, the measuring device is used to sense variations mounted in such distance and, based on such variations, alter the operating condition of the motor.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
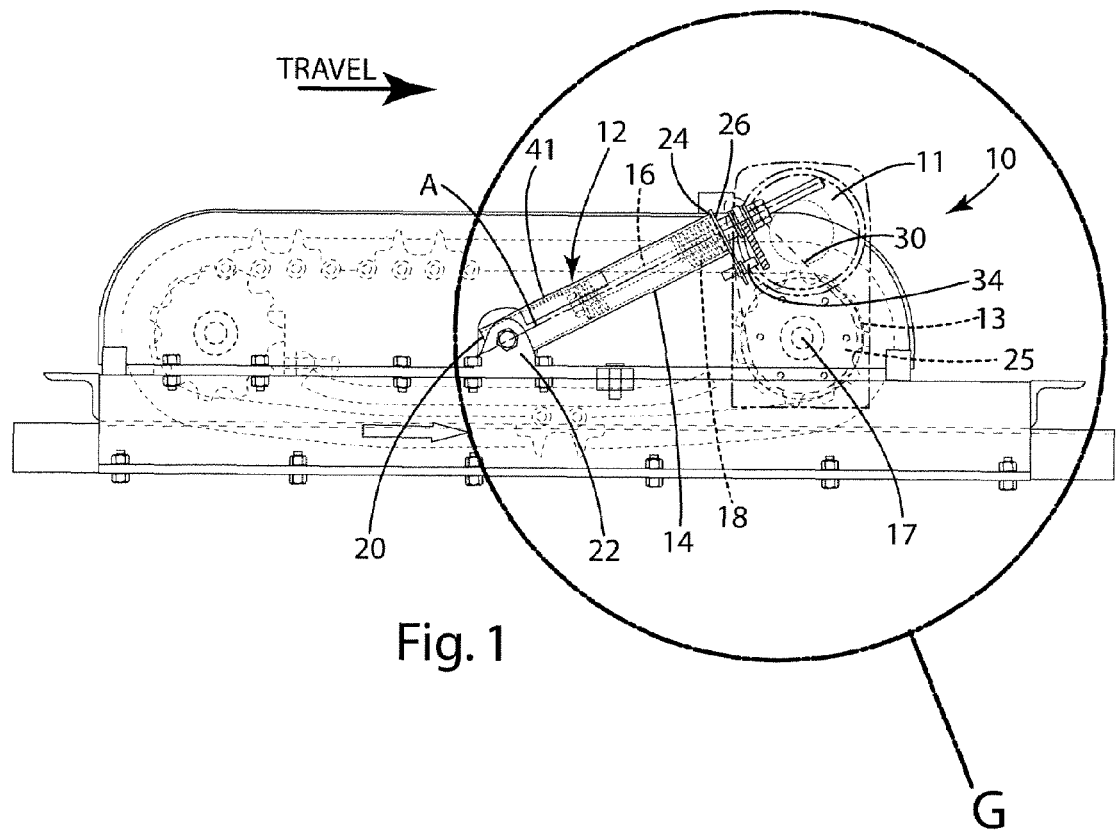
FIG. 1 is a side view of the present invention in use with an electric drive unit.
Figure 2:
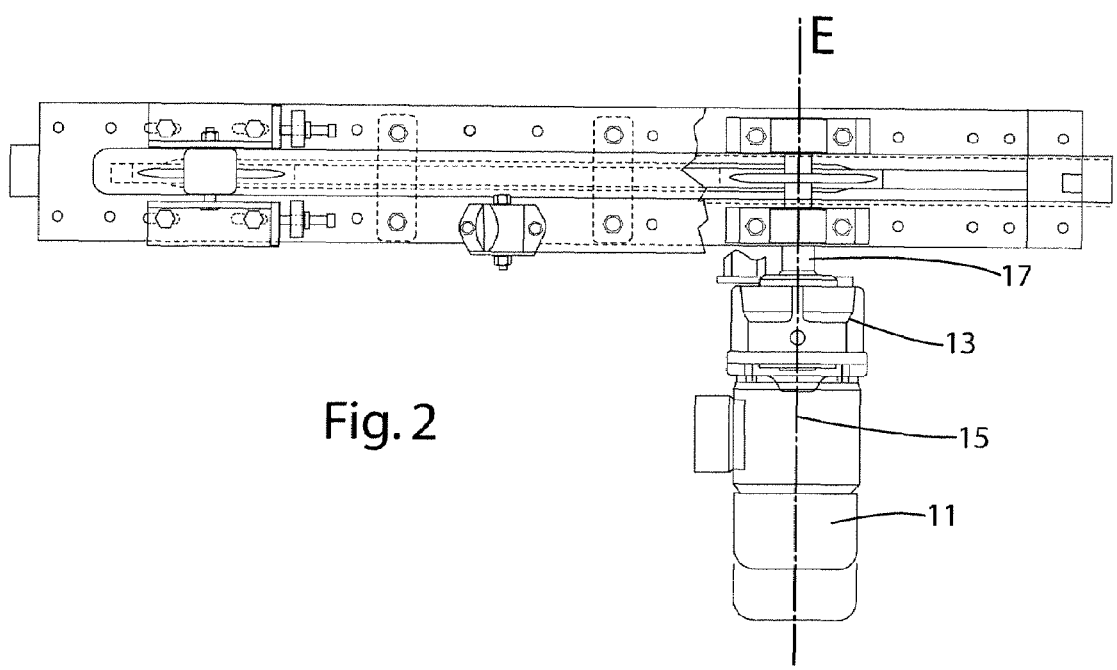
FIG. 2 is a top view of FIG. 1.
Figure 6:
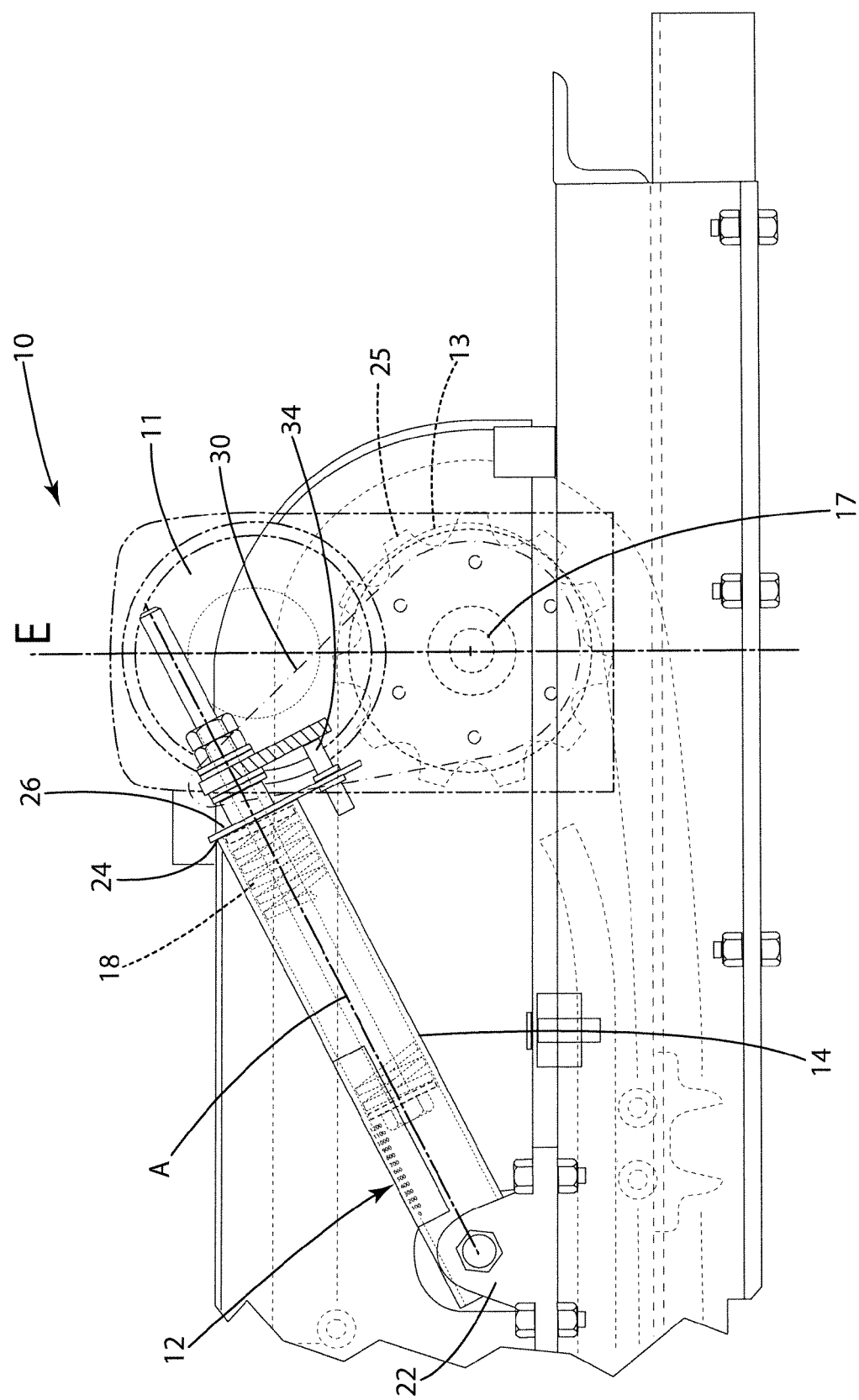
FIG. 6 is an exploded view taken from G in FIG. 1.

An overload protection system is shown generally at 10 in FIG. 1. The overload protection system 10 is used in connection with an electric motor 11 and a reducer 13. The electric motor 11, in combination with the reducer 13, is typically used in connection with providing a drive unit to drive various items. The electric motor 11 rotates about an axis 15 thereby transmitting a force to a gear 25 in the reducer 13 to provide output rotation from the reducer 13 to an output shaft 17 extending along a reducer axis. In the preferred embodiment shown in FIG. 2, the axis 15 of the electric motor 11 and the axis of the reducer output shaft 17 are provided to be coplanar along plane E. This is also shown in FIG. 6 where the output shaft 17 of the reducer is vertically aligned with the axis of the motor. It should be appreciated that in other examples, the axis 15 of the electric motor 11 and the output shaft 17 of the reducer 13 may not be coplanar along plane E.

Figure 3:
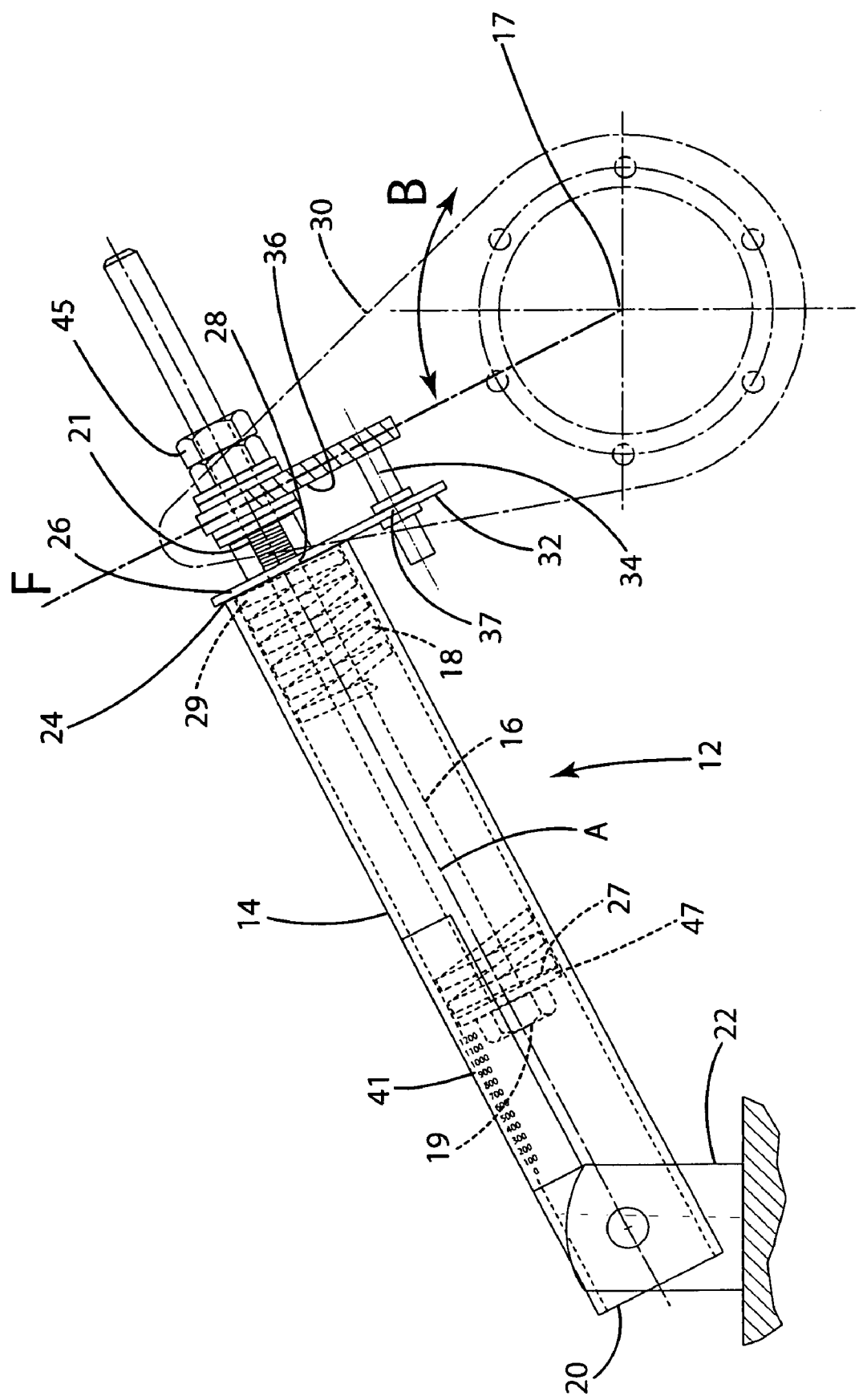
FIG. 3 is a side view of the present invention showing a bracket in phantom.

The overload protection system 10 includes the use of a torque arm assembly shown generally at 12 in FIGS. 1, 3, and 6 to protect, for example, the electric motor 11 from experiencing an overload condition. The torque arm assembly 12 includes a housing 14 having a first end 20 rotatably mounted to the fixture 22 and a second end 24. The torque arm assembly 12 includes a torque fastener 16 extending co-axially along an axis A of the housing 14. In the preferred embodiment, the torque fastener 16 is shown as a bolt. In the preferred embodiment, the torque fastener 16 includes a head portion 19 on one end and a threaded portion 21 on the other end adjacent to the second end 24 of the housing 14. The torque fastener 16 further includes a spring 18 extending co-axially with the torque fastener 16 and the housing 14 along axis A. The second end 24 of the housing 14 includes a bore 28 extending through a cap portion 26 of the second end 24.

The torque fastener head portion 19 is retained on one end 27 of the spring 18 through the use of a washer 47 while the other end of the torque fastener 16 having the threaded portion 21 extends through the bore 28 and is adapted to receive at least one torque nut 45.

A second end 29 of the spring 18 is retained inside of the housing 14 and adjacent to the cap portion 26. The threaded portion 21 of the torque fastener 16 also extends through a bore 28 of a reducer bracket 30. The reducer bracket 30 is fixedly attached to an output shaft 17 of the reducer 13 such that upon rotation of the output shaft 17 of the reducer 13, the reducer bracket 30 rotates along an arcuate path B, shown in FIG. 3, with said output shaft 17. The reducer bracket 30 further includes a measurement surface 36 positioned at a predetermined distance radially from the axis 17 of the reducer 13 and along a plane F perpendicular to the axis A of the housing 14.

Figure 5:
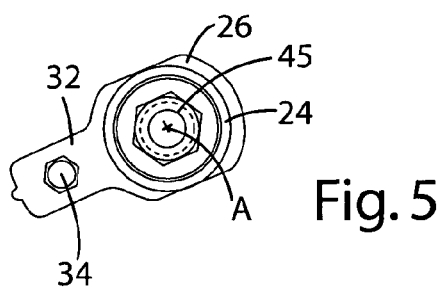
FIG. 5 is an end view of a portion of the present invention.

As shown in FIG. 5, the cap portion 26 of the housing 14 further includes a flange 32 extending laterally from the axis A of the housing 14 and is adapted to receive a measuring device 34. In the preferred embodiment, the flange 32 includes a bore 37 extending through the flange 32 for receiving and mounting the measuring device 34. In the preferred embodiment, the measuring device 34 is an inductive proximity switch capable of measuring up to two millimeters of movement and adapted to extend through the bore 37 of the flange 32. It should be appreciated that although in the preferred embodiment an inductive proximity switch is used, other measuring devices may also be used including, without limitation, capacitive proximity switches or mechanical switches such as a push button limit switch. In addition, it should also be appreciated that the measuring device 34 could be mounted to the flange 32 in many other various ways.

Figure 4:
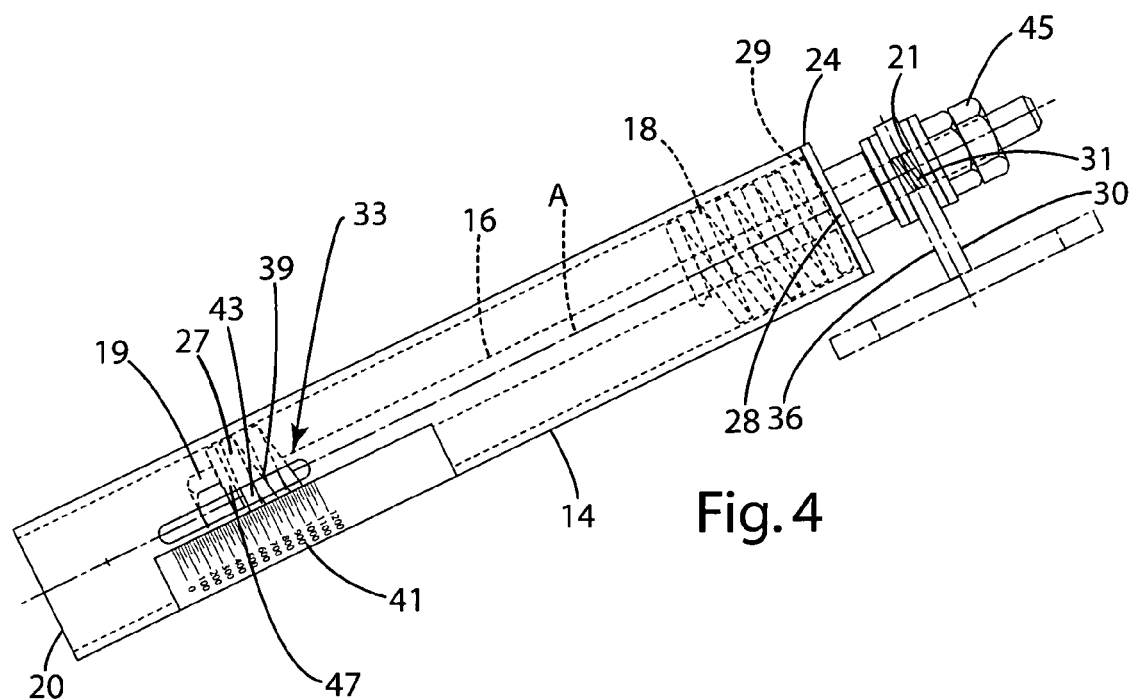
FIG. 4 is a side view of a portion of the subject invention showing a bracket in phantom.

In FIG. 4, the housing 14 further includes a load monitoring system shown generally at 33 having a slot 39 extending parallel with axis A of the housing 14 to permit an operator to view the movement of the spring 18 therethrough. Such movement can be aided by, for example, having a marking such as a yellow line placed on the washer 47, or the coils 43. Further, adjacent the slot 39, the housing 14 is provided with a set of indicators 41 extending perpendicular to the axis A of the housing 14.

In operation, a preset torque is applied to the output shaft 17 of the reducer 13 by the torque arm assembly 12 by tightening the torque nut 45. This is accomplished since the head portion 19 of the torque fastener 16 is retained on one end of the spring 18 while the thread portion 21 of the torque fastener 16 is retained on the reducer bracket 30 through the use of the torque nut 45. In tightening the torque fastener nut 45, the spring 18 being retained in the housing 14 is compressed to thereby provide a preset torque to the output shaft 17 of the reducer 13. With the use of the load monitor system 33 including the slot 39 extending on the housing 14 in conjunction with the indicators 41, an operator is permitted to visually determine the amount of movement of the spring 18 thereby resulting in a corresponding preset torque applied to the output shaft 17. After setting the preset torque on the output shaft 17 of the reducer 13, the measuring device 34 is placed adjacent to the measurement surface 36. If the measurement surface 36 is sensed by the device 34 to have moved, a signal is sent to the electric motor. More specifically, in the preferred embodiment, the inductive proximity switch is connected to an electrical power source thereby charging a magnet located on one end of the proximity switch. The magnetic force between the measuring surface 34 and the magnetic end of the proximity switch is correlated to a distance in this example, zero. As such, once the measuring device 34 is set, any amount of torque which is greater than the preset torque will cause the surface 36 to move away from the device 34.

Figure 7:
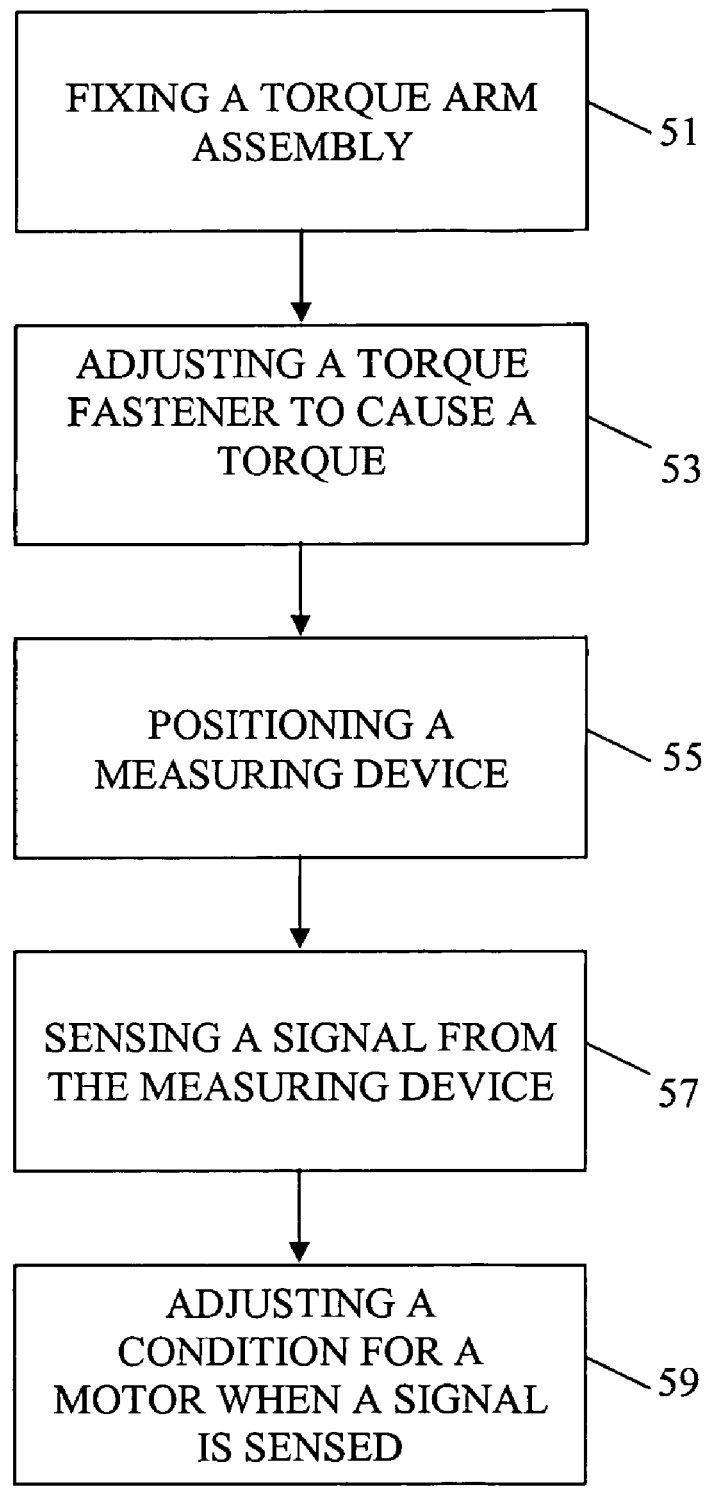
FIG. 7 is a flow chart showing the method of the present invention.

FIG. 7 shows a flow chart containing the method of protecting an electric motor against an overload condition. Step 51 represents fixing the torque arm assembly 12 on one end to the bracket 30 mounted on the reducer 13 output shaft 17 and on the other end rotatably to a fixture 22. Step 53 represents adjusting the torque fastener 16 to compress the spring 18 in turn causing a preset torque to be applied to the output shaft 17. Step 55 represents positioning the measuring device 34 adjacent to the measuring surface 36. Step 57 represents sensing a signal from said device 34 which corresponds to movement of the bracket 30. Step 59 represents adjusting a condition of the electric motor 11 based on a signal from said measuring device 34. In the preferred embodiment, the condition of the motor 11 is adjusted to an off condition; however, it should be appreciated that other condictions could be selected such as a reduced output.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An overload protection system for use in connection with an electric motor comprising:
a torque arm assembly including a housing having a torque fastener and a spring axially aligned with and retained on said torque fastener;
said housing having a first end adapted to be rotatably mounted to a fixture and a second end having a cap portion with a bore for receiving said torque fastener therethrough;
said torque fastener extending through said cap portion and mounted to a motor bracket;
a flange extending laterally from said cap portion and adapted to retain a measuring device; and
a measurement surface on said motor bracket, positioned at a predetermined distance radially from a rotating axis of a reducer and perpendicular to said measuring device.

2. The overload protection system claimed in claim 1 wherein said measuring device is positioned to measure the distance extending between said measuring device and said measurement surface.

3. The overload protection system claimed in claim 2 wherein said distance is dependent upon a preset torque resulting from compressing said spring.

4. The overload protection system claimed in claim 1 wherein said measuring device is an inductive proximity switch.

5. The overload protection system claimed in claim 1 wherein said housing includes a load monitor system.

6. The overload protection system claimed in claim 5 wherein said load monitor system includes indicators on said housing and spaced longitudinally along said housing.

7. The overload protection system claimed in claim 1 wherein said torque fastener is adapted to receive a nut.

8. The overload protection system claimed in claim 7 wherein said torque nut is adjustable along a longitudinal axis of said torque fastener.

9. The overload protection system claimed in claim 1 wherein said motor bracket is fixedly mounted to a reducer output shaft.

10. The overload protection system claimed in claim 9 wherein said reducer output shaft is aligned vertically with an output shaft of said electric motor.

11. The overload protection system claimed in claim 10 wherein said electric motor is adapted for use in connection with a conveyor system.

12. A method of protecting an electric motor from an overload condition comprising the steps of:

fixing a torque arm assembly, having a helical spring and torque fastener, to a reducer having a bracket mounted to said reducer on a first end, and rotatably to a fixture on a second end;

adjusting said torque fastener to compress said helical spring to a predetermined preload thereby causing a preset torque to be applied to an output shaft of said reducer;

positioning a measuring device adjacent to said bracket mounted to said reducer;

sensing a signal from said measuring device corresponding to movement of said bracket; and adjusting a condition of said electric motor when said signal from said measuring device mounted to said reducer is sensed.

13. The method of claim 12 wherein said reducer includes an output shaft vertically spaced from an output axis of said electric motor.

14. The method of claim 12 wherein said electric motor is adjusted to be in an off condition.

* * * * *

UNITED STATES PATENT AND TRADEMARK OFFICE
CERTIFICATE OF CORRECTION

PATENT NO. : 7,362,066 B2 Page 1 of 1
APPLICATION NO. : 11/437471
DATED : April 22, 2008
INVENTOR(S) : Daniel T. Emond It is certified that error appears in the above-identified patent and that said Letters Patent is hereby corrected as shown below:

In The Specification:

Column 4, Line 33, should read as follows: -- conditions could be selected such as a reduced output. --

Signed and Sealed this

Twelfth Day of August, 2008

JON W. DUDAS
*Director of the United States Patent and Trademark Office*